(12) United States Patent
Pala et al.

(10) Patent No.: US 10,300,789 B2
(45) Date of Patent: May 28, 2019

(54) VEHICLE HEADS-UP DISPLAY

(71) Applicant: DENSO International America, Inc., Southfield, MI (US)

(72) Inventors: Silviu Pala, Bloomfield Hills, MI (US); Robert Wunsche, III, Clarkston, MI (US); Michael Murzyn, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 9 days.

(21) Appl. No.: 15/658,857

(22) Filed: Jul. 25, 2017

(65) Prior Publication Data
US 2019/0031027 A1 Jan. 31, 2019

(51) Int. Cl.
*B60K 35/00* (2006.01)
*G02B 27/01* (2006.01)
*G09G 5/14* (2006.01)
*G09G 5/00* (2006.01)
*G06T 11/60* (2006.01)
*G06T 5/00* (2006.01)

(52) U.S. Cl.
CPC .......... *B60K 35/00* (2013.01); *G02B 27/0101* (2013.01); *G06T 5/006* (2013.01); *G06T 11/60* (2013.01); *G09G 5/003* (2013.01); *G09G 5/14* (2013.01); *B60K 2350/106* (2013.01); *B60K 2350/1096* (2013.01); *B60K 2350/2052* (2013.01); *G02B 2027/014* (2013.01); *G09G 2320/10* (2013.01); *G09G 2340/045* (2013.01); *G09G 2340/125* (2013.01); *G09G 2380/10* (2013.01)

(58) Field of Classification Search
CPC ................................. B60K 35/00; G09G 5/14
See application file for complete search history.

(56) References Cited

U.S. PATENT DOCUMENTS

| | | | | |
|---|---|---|---|---|
| 9,483,927 | B2 * | 11/2016 | Wolter | B60W 50/14 |
| 2007/0198145 | A1 * | 8/2007 | Norris | B60T 7/22 701/23 |
| 2013/0169679 | A1 * | 7/2013 | Su | G02B 27/01 345/633 |
| 2014/0092134 | A1 * | 4/2014 | Nagasawa | B60K 35/00 345/633 |
| 2015/0261219 | A1 * | 9/2015 | Cuddihy | B60J 3/04 701/23 |
| 2015/0331238 | A1 * | 11/2015 | Roth | B60K 37/00 348/115 |
| 2016/0023665 | A1 * | 1/2016 | Sherony | B60W 50/12 701/2 |

(Continued)

*Primary Examiner* — Ryan R Yang
(74) *Attorney, Agent, or Firm* — Harness, Dickey & Pierce, P.L.C.

(57) ABSTRACT

A display system for a vehicle. The display system includes a display engine that displays an image visible to a driver of the vehicle. In a first configuration, the display engine projects vehicle operating information directly in front of the driver. In a second configuration, the display engine projects an augmented reality image of an environment ahead of the vehicle directly in front of the driver. In a third configuration, the display engine projects entertainment images at a center of a dashboard of the vehicle between a driver's seat and a front passenger seat.

17 Claims, 5 Drawing Sheets

(56) References Cited

U.S. PATENT DOCUMENTS

| | | | |
|---|---|---|---|
| 2016/0142689 A1* | 5/2016 | Karikomi | G01D 11/28 |
| | | | 348/745 |
| 2016/0170205 A1* | 6/2016 | Yamaoka | B60K 35/00 |
| | | | 359/630 |
| 2017/0021765 A1* | 1/2017 | Mori | B60Q 9/00 |
| 2017/0136878 A1* | 5/2017 | Frank | B60W 50/14 |
| 2017/0140603 A1* | 5/2017 | Ricci | B60L 11/182 |
| 2017/0147959 A1* | 5/2017 | Sweeney | G05D 1/0022 |
| 2017/0158175 A1* | 6/2017 | Fairfield | B60T 7/12 |
| 2017/0315771 A1* | 11/2017 | Kerr | G06F 3/1446 |
| 2018/0017791 A1* | 1/2018 | Beckman | B60J 3/02 |
| 2018/0080399 A1* | 3/2018 | Jun | F02D 31/002 |
| 2018/0088323 A1* | 3/2018 | Bao | G02B 27/0093 |
| 2018/0173237 A1* | 6/2018 | Reiley | G05D 1/0214 |
| 2018/0225968 A1* | 8/2018 | Wang | G08G 1/13 |

* cited by examiner

VEHICLE HEADS-UP DISPLAY

FIELD

The present disclosure relates to a display for vehicles, particularly a heads-up display for vehicles with autonomous drive systems.

BACKGROUND

This section provides background information related to the present disclosure, which is not necessarily prior art.

Many vehicles include display systems for displaying information to a driver, such as heads-up display (HUD) systems. While current display systems are suitable for their intended use, they are subject to improvement. The present teachings advantageously provide display systems (including HUD display systems) with various improvements and enhancements as compared to current display systems, as explained herein and as one skilled in the art will recognize.

SUMMARY

This section provides a general summary of the disclosure, and is not a comprehensive disclosure of its full scope or all of its features.

The present teachings provide for a display system for a vehicle. The display system includes a display engine that displays an image visible to a driver of the vehicle. In a first configuration, the display engine projects vehicle operating information directly in front of the driver. In a second configuration, the display engine projects an augmented reality image of an environment ahead of the vehicle directly in front of the driver. In a third configuration, the display engine projects entertainment images at a center of a dashboard of the vehicle between a driver's seat and a front passenger seat.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
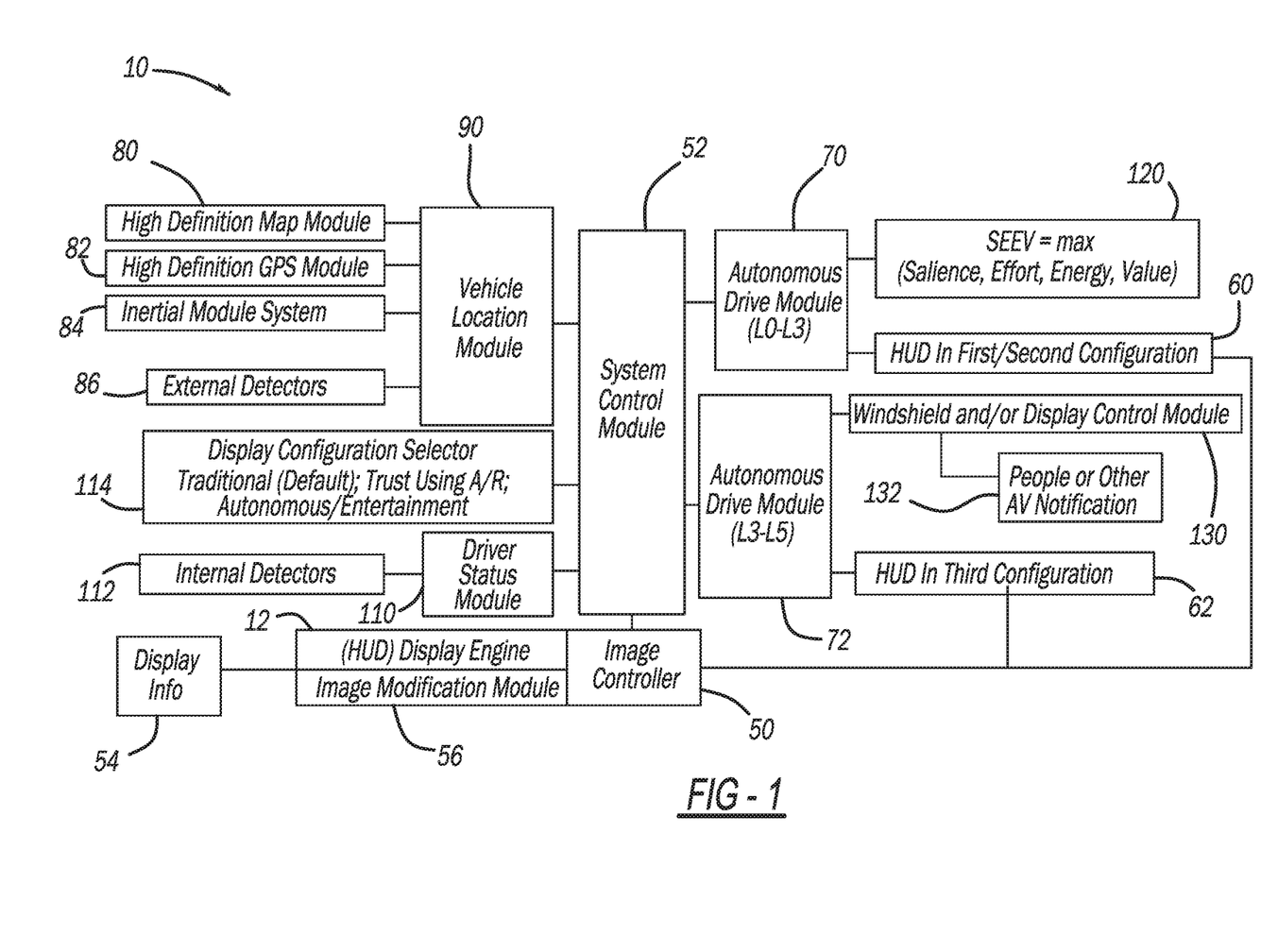
FIG. 1 illustrates an exemplary heads-up display (HUD) system in accordance with the present teachings.

FIG. 1 illustrates a display system 10 in accordance with the present teachings. The display system 10 displays images visible to a driver of a vehicle. In some configurations, the images are visible to both the driver and passengers, as explained herein. The images can be displayed in any suitable manner. For example and as illustrated in FIGS. 2A-4B, the images can be displayed with a heads-up display (HUD) 14 at a vehicle windshield 16. The display system 10 can be used with any suitable vehicle, such as any suitable passenger vehicle, recreational vehicle, mass transit vehicle, military vehicle, construction equipment, watercraft, aircraft, etc.

Figures 2A, 2B:
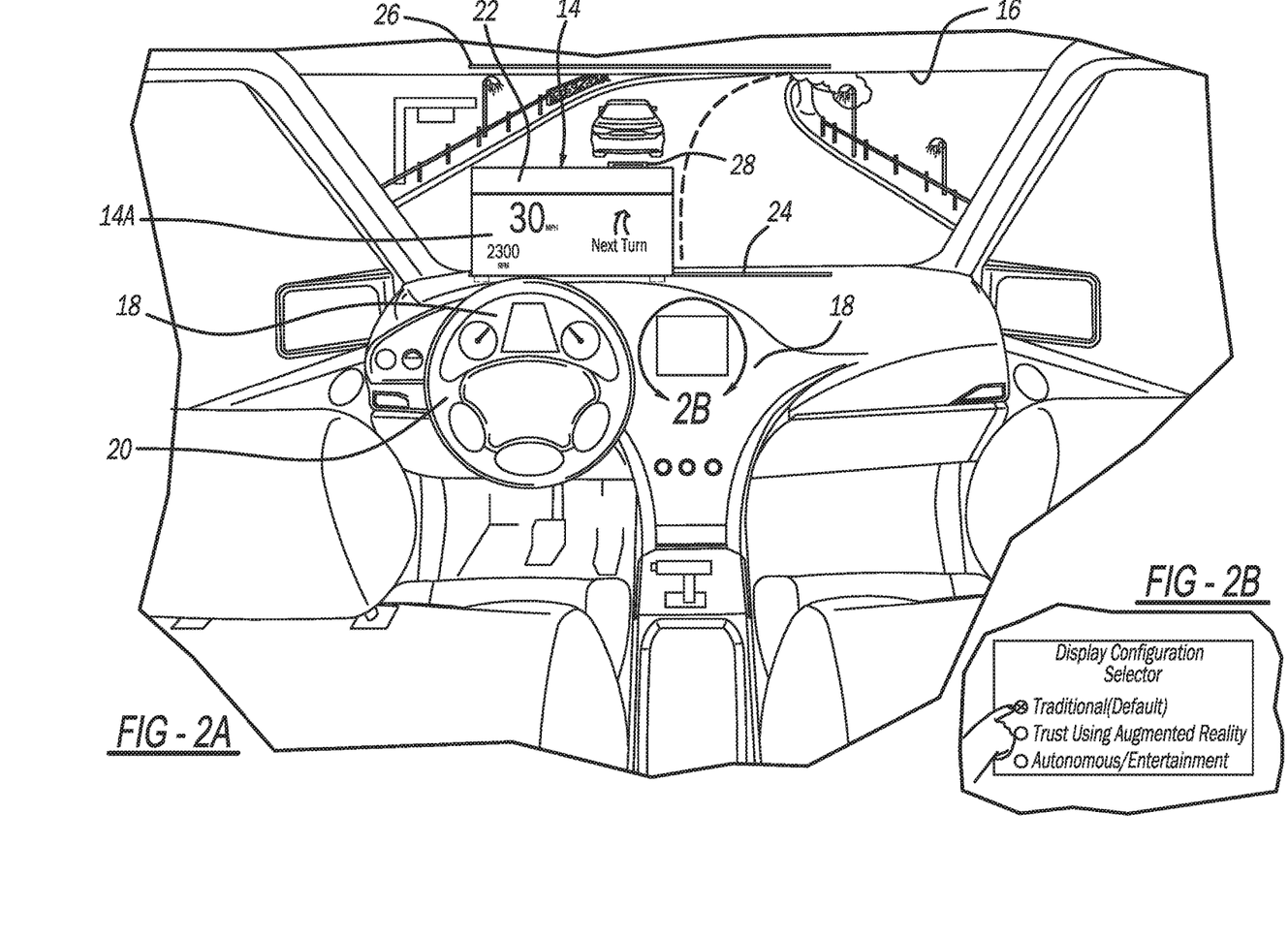
FIG. 2A is an interior view of a vehicle including the HUD system of FIG. 1, the HUD system configured to display standard vehicle operating information.
FIG. 2B illustrates area 2B of FIG. 2A.
Figures 3A, 3B:
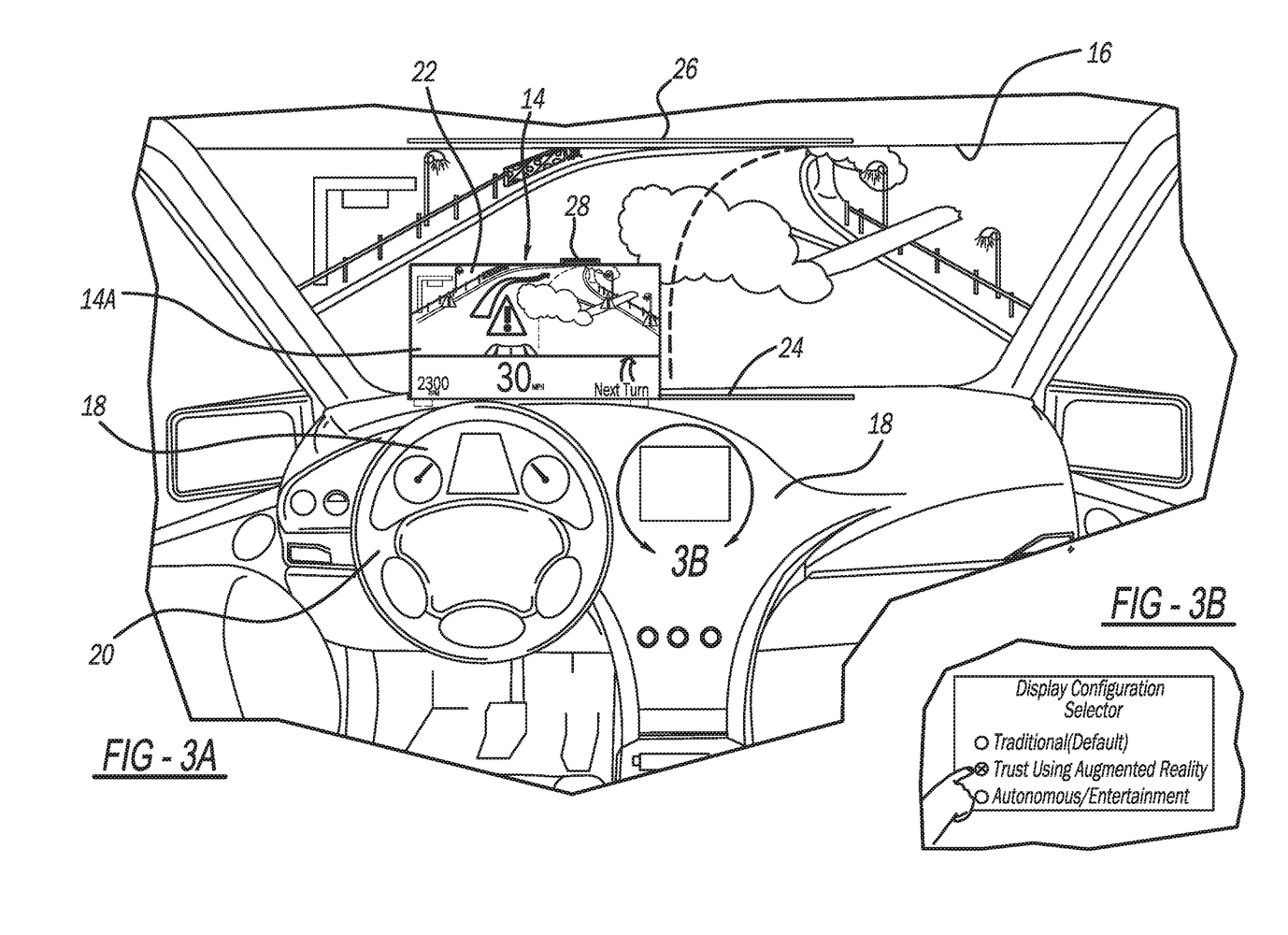
FIG. 3A is similar to FIG. 2A, but with the HUD system configured to display an augmented reality view of an environment about the vehicle.
FIG. 3B illustrates area 3B of FIG. 3A.

The HUD 14 can take any suitable form. For example, the HUD 14 can project information and/or images toward the windshield 16. The HUD 14 can alternatively include a display, such as at the windshield 16, that is a transparent or see-through display when inactive, but can display information and/or images thereon when active. The display can be movable into and out of an opening 24 in front of the windshield 16 (such as rollable into and out of the opening 24). As illustrated in FIGS. 2A and 3A, the display can extend partially from the opening 24. In an entertainment mode described herein, the display can be actuated so that it extends to a top of the windshield 16 where the display is secured at any suitable bracket or anchor 26. For example, a hook 28 of the display can be retained at the bracket or anchor 26.

The display system 10 can configure the HUD 14 in a variety of different configurations based on the autonomous drive level that the vehicle is operating in, as classified by the National Highway Traffic Safety Administration (NHTSA) and the Society of Automotive Engineers (SAE). NHTSA and SAE classify autonomous drive based on a scale of L0 to L5. At L0, the autonomous drive is not engaged, or minimally engaged. At L5 the autonomous drive is completely driving the vehicle. The different drive levels are further described herein.

Figures 4A, 4B:
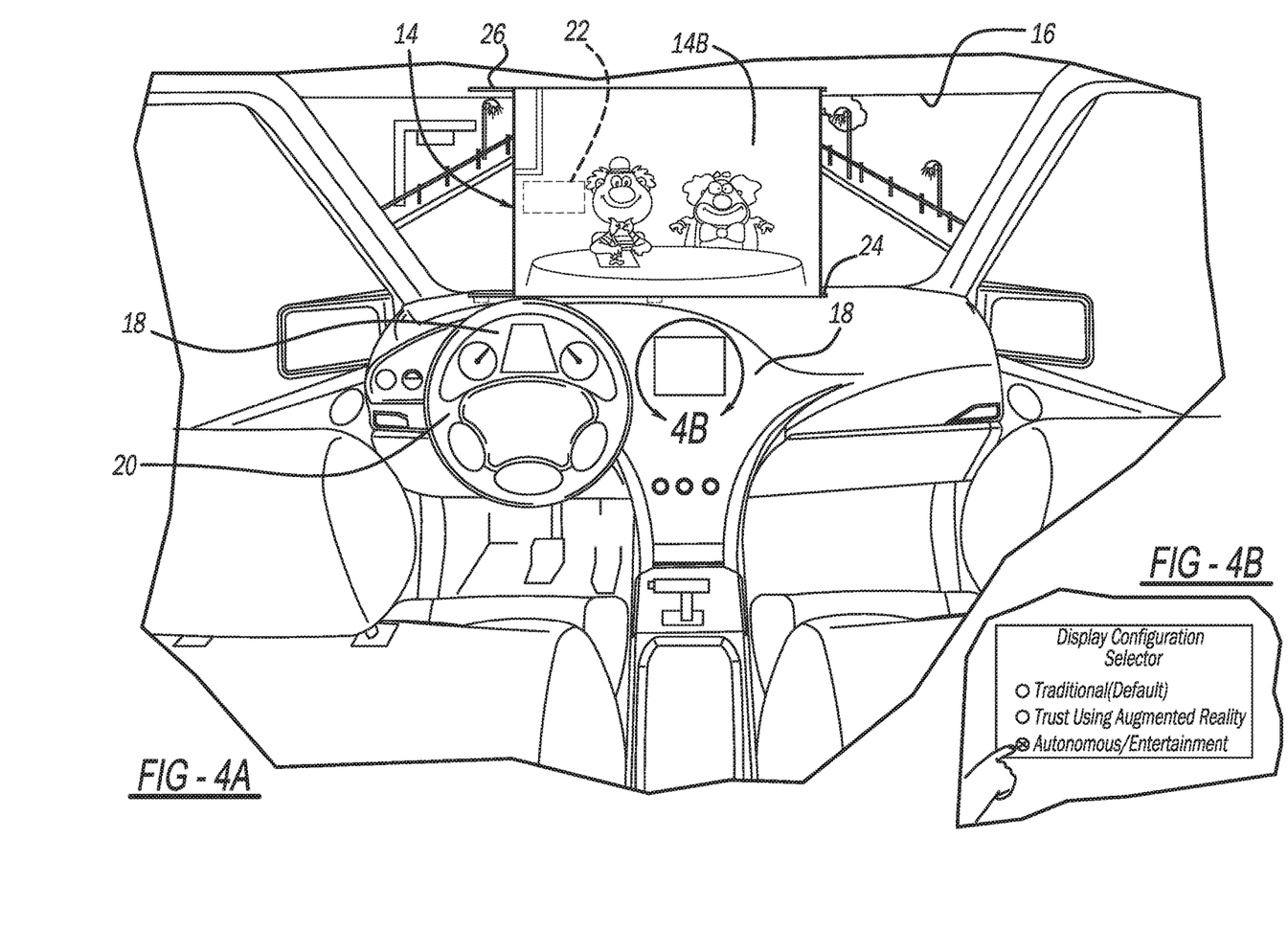
FIG. 4A illustrates the display of the HUD system moved to a center of the windshield and configured in an entertainment mode.
FIG. 4B illustrates area 4B of FIG. 4A.

When the autonomous drive is disengaged or only partially engaged, such as at autonomous drive levels 0, 1, or 2 for example, the display system 10 may configure the HUD 14 as a traditional HUD display 14A arranged directly in front of the driver and in front of steering wheel 20. The HUD 14 can be positioned at a relatively low position of the windshield 16, as illustrated in FIGS. 2A and 3A. When the autonomous drive level is at level L3, L4, or L5, the display system 10 configures the HUD as an entertainment HUD 14B, as illustrated in FIG. 4A. The entertainment HUD 14B can remain in front of the driver, or can be moved toward a center of the windshield 16 to be better seen by all passengers using any suitable mounting system. In the example of FIG. 4A, the HUD 14B is arranged generally at a center of the windshield 16 between the driver's seat and the front passenger seat of the vehicle. Positioning the entertainment HUD 14B at a center of the windshield 16 and the dashboard 18 advantageously makes it easier for passengers of the vehicle to view the entertainment HUD 14B. The traditional HUD 14A can be configured to display any suitable operating information of the vehicle, such as, but not limited to, vehicle speed, engine speed, road speed limit, vehicle directional headings, navigational commands, etc. The entertainment HUD 14B can be configured to display movies, games, or any other suitable video content for the entertainment of passengers of the vehicle, as well as the driver under safe conditions.

The HUD 14 can also display augmented reality information 22, regardless of whether the HUD 14 is configured as the traditional HUD display 14A or the entertainment HUD 14B. The augmented reality information 22 can include the environment ahead of the vehicle augmented with indications to the driver that obstacles, road lanes, etc. have been properly detected by any suitable external detectors 86 described herein, such as in a trust mode using augmented reality. In this trust mode the driver can advantageously see by way of the augmented reality information 22 that objects and lane markers have been detected, thus enhancing the driver's comfort level that the vehicle is being autonomously driven in a safe manner. The augmented reality information 22 can be arranged at any suitable location, such as above the HUD 14A (see FIG. 3A, for example), or at any suitable position of the entertainment HUD 14B (see FIG. 4A, for example).

With renewed reference to FIG. 1, the display system 10 includes an image controller 50, which is in communication with a general system control module 52. The image controller 50 is configured to operate the HUD 14, or any other suitable display, to display any suitable information 54, such as vehicle operating information, entertainment, gaming content, etc.

In this application, including the specific definitions provided, the terms "module" and "controller" may each be replaced with the term "circuit." The terms "module" and "controller" may each refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The HUD 14 is at least partially controlled by a display engine 12, such as a HUD display engine 12. The HUD display engine 12 configures the HUD 14 to display the HUD 14A or the HUD 14B, either of which can include the augmented reality information 22. The display engine 12 reconfigures the HUD 14 when the HUD 14 switches from the driver's (traditional) HUD 14A to the entertainment HUD 14B using the image modification module 56. The image modification module 56 reconfigures the size and shape of the image displayed by the HUD 14 to account for any distortion or warping that may result when the entertainment HUD 14B is projected at the center of the windshield 16, which will typically have a different shape, contour, and/or curvature as compared to the portion of the windshield 16 directly in front of the steering wheel 20. For example, the image modification module 56 can change the regular red, green, blue (RGB) of the image based on the curvature of the windshield 16 so that the image displayed is not distorted.

The system control module 52 is in communication with the image controller 50 to configure the HUD 14 in the first or second configuration 60 (traditional HUD 14A with or without augmented reality information 22), or the third configuration 62 (entertainment HUD 14B with or without augmented reality information 22), based on various operating parameters of the vehicle, and specifically autonomous drive modules 70 and 72. The autonomous drive module 70 is configured to operate the vehicle at autonomous drive levels L0, L1, L2, or L3. The autonomous drive module 70 can be any suitable autonomous drive module for providing autonomous drive at levels L0, L1, L2, or L3 which are levels generally recognized by NHTSA and SAE (such as SAE J3016 definitions). For example, in level L0 the autonomous drive module 70 will issue automated system issues warnings, but have no direct vehicle control. At level L1, the autonomous drive module 70 will share control with the driver. An example would be adaptive cruise control where the driver controls steering and the autonomous drive module 70 controls speed. Further examples of level L1 include parking assistance and lane keeping assistance. In level L2, the autonomous drive module 70 takes full control of vehicle acceleration, braking, and steering. The driver must, however, monitor the driving and be prepared to immediately intervene at any time if the automated system fails to respond properly. Contact between the driver's hands and the steering wheel is often required to confirm that the driver is ready to intervene. Thus at level L2 augmented reality information 22 would assist the driver to determine whether or not intervention is necessary. For example, if based on the augmented reality display 22 the driver determines that a particular obstacle was not recognized, then the driver will know that immediate intervention is necessary to avoid a possible collision. When the autonomous drive module 70 is engaged, the salience, effort, energy value (SEEV) will typically be at its maximum, as illustrated at block 120. At level L2, there is partial automation and the autonomous drive module 70 is responsible for steering and braking. This is when the "trust mode" using augmented reality described further herein is important. When the HUD 14 is in the "trust mode" using augmented reality the HUD 14 can be in the semi-extended position of FIG. 3A, or fully extended such that the display is extended to the top of the windshield 16 so that the display is connected to the bracket or anchor 26.

Autonomous drive module 72 is configured to operate the vehicle at autonomous drive levels L3, L4, and L5. In level L3, the driver can safely turn his or her attention away from driving tasks, which would allow the driver to safely view the entertainment HUD 14B. The vehicle will handle situations that call for an immediate response, such as emergency braking. The driver must still be prepared to intervene with some limited time when called upon by the vehicle to do so. Level L4 does not require any attention of the driver for safety, thus the driver may safely go to sleep or leave the driver's seat. In level L5, no human intervention is ever required.

The location of the vehicle can be determined, such as for autonomous driving, navigation, and configuration of the HUD 14, by any suitable vehicle location module 90. The vehicle location module 90 can receive any suitable inputs to determine the location of the vehicle. For example, the vehicle location module 90 can receive inputs from any suitable high definition map module 80, high definition GPS module 82, and/or an inertial module system 84. Various external detectors 86 can also be used to determine the vehicle's location, such as any suitable radar, lidar, or any suitable camera.

The system control module 52 also receives inputs from a driver status module 110 to determine the status of the driver, such as the degree to which the driver is alert. The driver status module 110 can determine the alertness of the driver in any suitable manner, such as based on any suitable internal detectors 112, which may include cameras focused on the driver, a driver status monitor, etc. The autonomous drive level can be set based on the alertness of the driver. For example, if the driver is asleep, the autonomous drive module 72 may set the autonomous drive level to L5.

The display system 10 can further include a display configuration selector 114. The display configuration selector 114 can be any suitable input device, such as a switch, button, etc., for use by the driver to select the configuration of the HUD 14 that the driver would like, such as the first configuration 60 (FIG. 2A, for example), the second configuration 60 (FIG. 3A, for example), or the third configuration 62 (FIG. 4A, for example).

Figure 5:
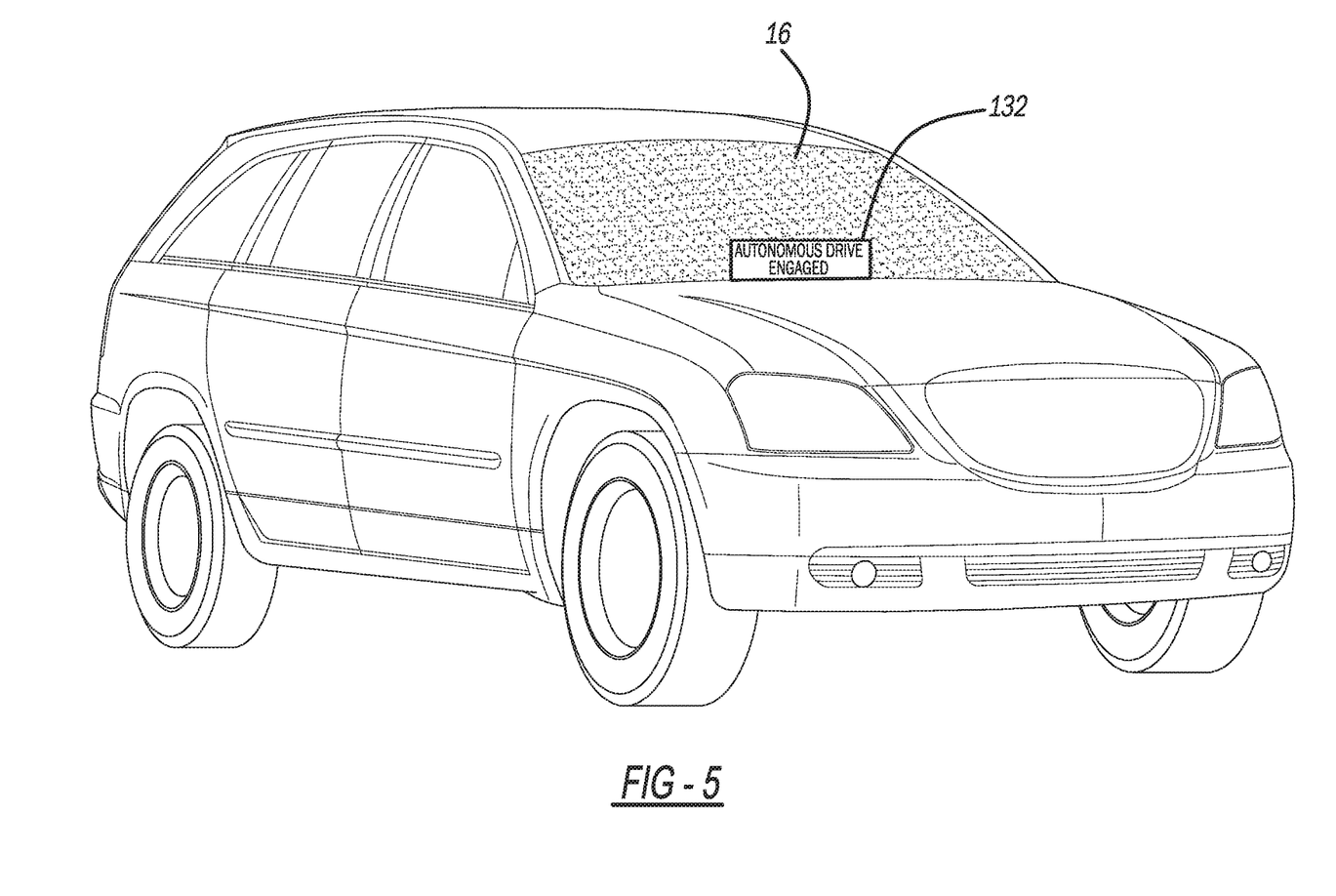
FIG. 5 is an exterior view of the vehicle including the HUD system of FIG. 1, the HUD system configured to display a notice indicating that that the vehicle is operating autonomously.

The display system 10 further includes a windshield control module 130. The windshield control module 130 is configured to modify the transparency of the windshield 16, such as by increasing or decreasing the opaqueness of the windshield 16. By increasing the opaqueness of the windshield 16 when the HUD 14 is in the third configuration 62, the entertainment HUD 14B will be easier for occupants of the vehicle to view, and those outside of the vehicle will be prevented from viewing the entertainment HUD 14B. The windshield control module 130 can also display any suitable notification 132 for pedestrians, other drivers, or other traffic members on the windshield 16, or at any other suitable location. For example, the notification 132 can be displayed such that it is visible at an exterior of the vehicle windshield 16 as illustrated in the example of FIG. 5. The notification 132 can be on the opaque layer or on an independent layer at the windshield 16. The notification 132 may take any suitable form, such as a text notification indicating that the vehicle is being operated in an autonomous drive mode.

Thus the display system 10 advantageously configures the HUD 14 in a first configuration (FIG. 2A, for example) or second configuration (FIG. 3A, for example) at block 60, or a third configuration (FIG. 4A, for example) at block 62 based on the autonomous drive mode of the vehicle. Specifically and as illustrated in FIG. 2A, when the autonomous drive module 70 is engaged, the image controller 50 and the display engine 12 will configure the HUD 14 to display the first configuration HUD 14A, which displays operating information of the vehicle, such as vehicle speed, engine speed, road speed limit, vehicle directional heading, navigational commands, etc. The HUD 14A can be augmented with augmented reality information 22, as illustrated in the example of FIG. 3A, which will notify the driver whether or not obstacles, lane markers, and other objects are being detected by the autonomous drive module 70 and the external detectors 86. The inclusion of the augmented reality information 22 provides the second configuration 60 of the HUD 14. When the autonomous drive module 72 is engaged, the image controller 50 and the display engine 12 configure the HUD 14 as the entertainment HUD 14B, such as illustrated in the example of FIG. 4A. The image modification module 56 will modify the HUD 14 so that the entertainment HUD 14B is not distorted by the curvature of the windshield 16 at the center of the windshield 16. The windshield control module 130 will advantageously increase the opacity of the windshield 16 so that people outside of the vehicle cannot see the entertainment HUD 14B, and so that the entertainment HUD 14B is more clearly visible to occupants of the vehicle. The notification 132 can be issued by the windshield control module 30 to notify those outside of the vehicle that the vehicle is operating autonomously, such as illustrated in the example of FIG. 5.

As a further advantage, the driver can manually place the HUD 14 in the first or "Traditional (Default)" configuration of FIG. 2A, the second or "Trust Using Augmented Reality" configuration of FIG. 3A, or the third or "Autonomous/Entertainment" configuration of FIG. 4A using any suitable Display Configuration Selector 114. The Selector 114 can include any suitable selector, such as any suitable selector switch, button, dial, voice command, etc. In the examples illustrated, the instrument panel 18 includes a display that identifies the mode that the Display Configuration Selector 114 is in. Specifically, FIG. 2B indicates that the HUD 14 of FIG. 2A has been placed in the "Traditional (Default)" configuration; FIG. 3B indicates that the HUD 14 of FIG. 3A has been placed in the "Trust Using Augmented Reality" configuration; and FIG. 4B indicates that the HUD 14 of FIG. 4A has been placed in the "Autonomous/Entertainment" configuration. The "Traditional (Default)" configuration of FIG. 2A can be a default configuration that the vehicle is placed in at start-up. Thus, at start-up there is no need to select the "Traditional (Default)" setting, but the "Traditional (Default)" setting may be selected after one of the other settings has been selected.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A display system for a vehicle comprising:
  a display engine and configuration selector that displays an image visible to a driver of the vehicle, in a first configuration the display engine projects vehicle operating information directly in front of the driver, in a second configuration the display engine projects an augmented reality image of an environment ahead of the vehicle directly in front of the driver, and in a third configuration the display engine projects entertainment images in front of the driver or at a center of a dashboard of the vehicle between a driver's seat and a front passenger seat; and
  an image controller that:
  sets the display engine in the first configuration when an autonomous drive system of the vehicle is not engaged;
  sets the display engine in the second configuration when the driver shares control of the vehicle with an autonomous drive system; and
  sets the display engine in the third configuration when the vehicle is fully driven by an autonomous drive system of the vehicle.

2. The display system of claim 1, wherein the vehicle operating information includes at least one of vehicle speed, engine speed, road speed limit, vehicle directional heading, and navigational commands.

3. The display system of claim 1, wherein the augmented reality image includes the environment ahead of the vehicle augmented with indications to the driver that a detection system of the vehicle has detected obstacles and road lanes ahead of the vehicle, and vehicle location and path are determined and shown.

4. The display system of claim 1, wherein the entertainment images include video images.

5. The display system of claim 1, wherein the entertainment images include gaming images.

6. The display system of claim 1, wherein the display engine includes a heads-up display engine that displays the image at a windshield of the vehicle, an image modification module modifies the image to accommodate contour of the windshield at a center of the windshield when the display engine is in the third configuration.

7. The display system of claim 1, further comprising a windshield control module that makes the windshield opaque when the display engine is in the third configuration.

8. The display system of claim 7, wherein the windshield control module generates a notification to persons proximate to the vehicle to notify the persons that the vehicle is operating in an autonomous drive mode.

9. The display system of claim 1, wherein the display engine displays the image on a heads-up display (HUD).

10. The display system of claim 1, wherein the display engine displays the image at a dashboard of the vehicle.

11. A method for displaying images to a driver of a vehicle comprising:
  displaying vehicle operating information directly in front of the driver with a display engine set in a first configuration by an image controller when an autonomous drive system of the vehicle is not activated;
  displaying an augmented reality image of the environment ahead of the vehicle directly in front of the driver with the display engine set in a second configuration by the image controller when the autonomous drive system partially drives the vehicle; and
  displaying entertainment images in front of the driver or at a center of a dashboard of the vehicle between a driver's seat and a front passenger seat with the display engine set in a third configuration by the image controller when the autonomous drive system completely drives the vehicle.

12. The method of claim 11, further comprising displaying in the augmented reality image the environment ahead of the vehicle augmented with indications to the driver that a detection system of the vehicle has detected obstacles and road lanes ahead of the vehicle.

13. The method of claim 11, wherein the entertainment images include video images.

14. The method of claim 11, further comprising modifying the image with an image modification module to accommodate shape and contour of the windshield at a center of the windshield when the display engine is in the third configuration.

15. The method of claim 11, further comprising turning the windshield opaque with a windshield control module when displaying the entertainment images.

16. The method of claim 15, further comprising generating a notification to persons and other vehicles proximate to the vehicle notifying the persons and other vehicles that the vehicle is operating in an autonomous drive mode.

17. The method of claim 11, further comprising displaying the images with a heads-up display, the heads-up display includes a transparent display that is configured to be opaque when displaying the entertainment images and when the autonomous drive system completely drives the vehicle.

\* \* \* \* \*